3,314,871
METHOD OF CATAPHORETIC DEPOSITION OF LUMINESCENT MATERIALS

Raymond F. Heck, Wilton, Roland W. Muehleisen, Norwalk, and Kenneth Speigel, Stamford, Conn., assignors to Columbia Broadcasting System, Inc., New York, N.Y., a corporation of New York
No Drawing. Filed Dec. 20, 1962, Ser. No. 245,999
5 Claims. (Cl. 204—181)

This invention relates to a method of preparing thin luminescent layers of uniform thickness and, more particularly, to a novel and highly effective method for cataphoretic deposition of luminescent materials to form luminescent layers directly on a substrate without producing an intervening layer that can affect the transmission of radiant energy between the layer and the substrate.

It has been proposed, heretofore, to lay down thin luminescent layers on a substrate by coating a surface of the substrate with a transparent electrically conductive coating such as tin oxide, immersing the coated substrate in an alcohol-electrolyte medium having finely divided luminescent particles suspended therein, and causing cataphoretic deposition of the luminescent particles on the conductive coating by applying D.C. voltage between the coating and anode means in the suspension. This technique has not been found entirely satisfactory because the conductive coating is permanently sandwiched between the substrate and the layer of luminescent material so that it tends to reduce appreciably the radiant energy output from the luminescent layer towards the substrate.

Also, the process results in the production of isolated heavy spots, shiny spots or other irregularities in the conductive film which give the appearance of voids or dead spots in the luminescent layer. These defects have limited the degree of resolution that can be achieved in cathode ray tubes and the like, the luminescent phosphor screens of which have been made in accordance with this technique.

The above-noted deficiencies of the prior process are overcome, according to the invention, by forming the conductive coating on the substrate of a material that can be readily removed after deposition of the luminescent layer without damaging the latter. More specifically, the conductive layer is formed by evaporating on the substrate a metal or metal oxide having a low vaporization point and good electrical conductivity. The coated substrate is then immersed in a liquid suspension of luminescent particles and a voltage applied between the conductive coating and anode means to cause cataphoretic deposition of the particles on the conductive coating. After drying, the substrate with the conductive and luminescent layers formed thereon is heated under vacuum to a temperature high enough to evaporate the conductive coating leaving the cataphoretic luminescent layer firmly bonded directly to the substrate. It has been found that the conductive layer can be completely evaporated in this way wtihout damage to the luminescent layer.

With the removal of the intermediate conductive layer, there is no longer any reduction in the radiant energy output from the luminescent layer towards the substrate. Additionally, defects such as heavy spots or shiny spots characteristic of the luminescent layers made by present methods are prevented.

While the invention may be utilized in a wide range of applications, it will be illustrated herein as applied to the preparation of luminescent phosphor screens of the type used in cathode ray tubes. In this application, the substrate is made of a transparent material such as glass.

Before proceeding with the actual coating process, the glass surface to be coated should be thoroughly cleaned. This may be done by washing with a detergent solution such as a 1% solution of ammonium bifluoride (10 grams $NH_4FHF$ per 990 ml. $H_2O$) followed by rinsing in tap water and then distilled water. Final cleaning is done by suspending the glass in a vapor of boiling isopropyl alcohol. The surface should then be ready for vacuum deposition of a conductive coating.

The conductive coating may be deposited on the glass surface by means of conventional vacuum techniques. Metals such as zinc, cadmium and tellurium which have good conductivity and low vaporization temperatures are desirable, but other electrically conductive metals or metal oxides having vaporization temperatures below the softening point of glass may be used satisfactorily. The glass surface to be coated is placed in a bell jar below a molybdenum vessel containing the coating metal. The bell jar is then pumped down to a pressure of about $1 \times 10^{-5}$ mm. Hg. At this point, the glass should be heated by conventional electrical heating means, for example, to about 150° C. for 5 to 10 minutes, in order to evaporate any residue of cleaning fluids or any impurities on the glass substrate. The glass is then cooled to 50° C. or below while the conductive coating material is being heated to its vaporization point. The conductive coating is then evaporated onto the glass substrate to a thickness of say, 1 or 2 microns.

With zinc as the coating material, for example, evaporation of a layer one or two microns thick onto glass at room temperature in a vacuum of $1 \times 10^{-5}$ mm. Hg with the zinc heated to a temperature of 343° C. takes place in approximately 15–20 seconds. The deposition of the conductive coating being complete, the glass may then be removed from the bell jar.

The next step in the process is the electrophoretic deposition of the phosphor which may be performed in any suitable vessel. The coating solution consists of small phosphor particles suspended in an alcohol such as methanol. The coating solution may be prepared, for example, by mixing 10 grams of a luminescent phosphor such as the one designated "P16" and 500 ml. of methanol in a ball mill for about 40 hours. About 140 ml. of this slurry is mixed with 3,000 ml. of methanol and 16 ml. of water. The glass plate is suspended in this solution, which is at room temperature, and a voltage applied between the previously deposited zinc layer and nearby carbon anode means in the solution. The phosphor particles in the suspension are attracted to the coating to form the screen.

Various combinations of voltage and distance between the anodes and the conductive coating may be used as will be known to those skilled in the art. Good results are obtained with a voltage of 300 v. and a gap of about 1 in. The time for completing electrophoretic deposition may vary considerably within a range of 30 seconds to 3 minutes, or more, depending on the desired luminescent characteristics of the screen. When a phosphor screen of desired thickness has been thus deposited on the glass, the latter is removed from the solution and dried in the air or in an oven.

After drying, the screen is returned to a bell jar which is evacuated to about $1 \times 10^{-5}$ mm. Hg. The glass is then heated in any conventional manner to a temperature somewhat above the vaporization point of the conductive coating. For a coating made of zinc, which vaporizes at about 343° C. in a vacuum of $1 \times 10^{-5}$ mm. Hg, the glass may be heated to about 350° C. to 400° C. The glass is maintained at this temperature for about 10 to 15 minutes during which time the coating evaporates completely from between the deposited phosphor and the glass. The phosphor screen is left directly on the glass. It is then ready for subsequent processing such as for lacquering and aluminizing by well-known methods.

It should be noted that cathode ray tube phosphor screens produced by this method have exhibited no disadvantages over screens made by prior methods. The phosphor coating adheres to the glass substrate equally as well as the phosphor coatings of prior methods which adhere to metal substrates. For example, such phosphor screens have subsequently been subjected to a lacquering process in which the phosphor coated glass is immersed in water, and no deterioration of the phosphor screen has been observed. As noted above, screens made by the above described method exhibit much greater brightness, clarity, and freedom from defects. Accordingly, a high degree of resolution in cathode ray tubes is now readily attainable.

It will be appreciated that luminescent layers, according to the invention, can be formed in a wide range of patterns (e.g., stripes, letters, digits, etc.) by depositing the conductive layer in the same pattern. Also, by reversing the polarity of the voltage applied between the conductive coating or a portion thereof and the anode, the luminescent material can be repelled from selected areas of the substrate to form a pattern comprising an area containing no luminescent material, such area being defined or bounded by a luminescent layer of appropriate shape.

It will be understood that the invention as set forth in the foregoing description may be varied considerably, particularly with regard to the conductive coatings used and the environmental conditions under which the steps of the process are performed. Accordingly, the scope of the invention should not be limited to the specific examples described above but is intended to cover all modifications thereof coming within the scope of the following claims.

We claim:

1. In a process for forming a luminescent layer on a substrate, the steps of forming a thin coating of a conductive vaporizable material selected from the group consisting of metals and metal compounds with vaporization temperatures below the softening point in the substrate on the substrate, utilizing said conductive coating to effect cataphoretic deposition of a layer of luminescent material thereon, and removing said conductive coating by heating it to a high enough temperature below the softening point of the substrate and for a sufficient period of time to vaporize the same, leaving said luminescent material on said substrate.

2. In a process for forming a luminescent layer on a substrate, the steps of vacuum depositing a thin coating of a conductive vaporizable material selected from the group consisting of metals and metal compounds with vaporization temperatures below the softening point in the substrate on the substrate, disposing said coated substrate in a suspension of luminescent particles in an alcohol-electrolyte medium, establishing an electric field between said conductive coating and an anode in said medium to effect cataphoretic deposition of a layer of luminescent material on said conductive coating, drying said substrate, conductive coating and layer of luminescent material, and heating said conductive layer in a vacuum to a high enough temperature below the softening point of the substrate and for a sufficient time to remove the same by vaporization.

3. In a process for forming a phosphor layer on a transparent substrate, the steps of vacuum depositing a thin coating of a conductive vaporizable material selected from the group consisting of metals and metal compounds with vaporization temperatures below the softening point of the substrate on the substrate, disposing said coated substrate in a suspension of phosphor particles in an alcohol-electrolyte medium, establishing a unidirectional electric field between said conductive coating and an anode in said medium to effect cataphoretic deposition of a layer of phosphor material on said conductive coating, and heating said conductive layer in a vacuum to a high enough temperature below the softening point of the substrate and for a sufficient time to remove the same by evaporization.

4. A process as defined in claim 3 in which the thickness of the coating deposited on the substrate is of the of order of 1–2 microns.

5. In a process for forming a phosphor layer on a transparent substrate, the steps of vacuum depositing on said substrate a zinc coating of the order of 1–2 microns in thickness, disposing said coated substrate in a suspension of phosphor particles in an alcohol-electrolyte medium, establishing a unidirectional electric field between said zinc coating and an anode in said medium to effect cataphoretic deposition of a layer of phosphor material on said zinc coating, drying said substrate, zinc coating and phosphor layer, and heating said conductive layer in a vacuum at a temperature of at least 343° C. and below the softening point of the substrate for sufficient time to effect removal of the same by evaporization.

References Cited by the Examiner

UNITED STATES PATENTS

| 2,311,513 | 2/1943 | Bell | 117—33.5 |
| 2,702,274 | 2/1955 | Law | 204—192 |
| 2,851,408 | 9/1958 | Cerulli | 204—181 |

FOREIGN PATENTS

| 634,702 | 3/1950 | Great Britain. |
| 655,032 | 7/1951 | Great Britain. |
| 724,086 | 2/1955 | Great Britain. |

HOWARD S. WILLIAMS, *Primary Examiner.*

MURRAY TILLMAN, *Examiner.*

G. E. BATTIST, E. ZAGARELLA,
*Assistant Examiners.*